(12) United States Patent
Isono et al.

(10) Patent No.: US 10,761,372 B2
(45) Date of Patent: *Sep. 1, 2020

(54) IMAGE DISPLAY APPARATUS

(71) Applicant: Panasonic Intellectual Property Management Co., Ltd., Osaka (JP)

(72) Inventors: Takamitsu Isono, Osaka (JP); Toshihiko Ura, Osaka (JP); Koujirou Higa, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/094,299

(22) PCT Filed: Feb. 6, 2018

(86) PCT No.: PCT/JP2018/003999
§ 371 (c)(1),
(2) Date: Oct. 17, 2018

(87) PCT Pub. No.: WO2018/147268
PCT Pub. Date: Aug. 16, 2018

(65) Prior Publication Data
US 2019/0113808 A1   Apr. 18, 2019

Related U.S. Application Data

(60) Provisional application No. 62/456,836, filed on Feb. 9, 2017.

(30) Foreign Application Priority Data

Aug. 24, 2017 (JP) ................................ 2017-161516

(51) Int. Cl.
*G02F 1/1335* (2006.01)
*G02F 1/13357* (2006.01)
*G02F 1/1333* (2006.01)

(52) U.S. Cl.
CPC .. *G02F 1/133611* (2013.01); *G02F 1/133308* (2013.01); *G02F 1/133605* (2013.01);
(Continued)

(58) Field of Classification Search
CPC .......................... G02B 6/426; G02F 1/133608
See application file for complete search history.

(56) References Cited

U.S. PATENT DOCUMENTS

2005/0281050 A1* 12/2005 Chou ........................ F21K 9/00
362/612
2006/0285356 A1* 12/2006 Tseng ................... G02B 6/0016
362/608

(Continued)

FOREIGN PATENT DOCUMENTS

| JP | 2011-151002 A | 8/2011 |
| JP | 2017-069154 A | 4/2017 |
| WO | 2011/001754 A1 | 1/2011 |

OTHER PUBLICATIONS

International Search Report issued in Application No. PCT/JP2018/003999 dated Apr. 17, 2018, with English translation.

*Primary Examiner* — Evan P Dzierzynski
*Assistant Examiner* — Keith G. Delahoussaye
(74) *Attorney, Agent, or Firm* — McDermott Will & Emery LLP

(57) ABSTRACT

An image display apparatus includes: a display panel; a back frame including a flat portion and a side wall; light sources arranged in rows and columns at substantially equal intervals in the flat portion; support pins arranged in rows and columns at substantially equal intervals in the flat portion and away from the light sources; a diffuser panel diffusely (Continued)

emitting light from the light sources toward the display panel; and a luminance-equalizing sheet that is supported on the support pins, between the diffuser panel and the back frame, has an outer edge substantially overlapping an outer edge of an active area of the display panel, and transmits part of the light from the light sources toward the diffuser panel. The luminance-equalizing sheet protrudes in a curved manner toward the side wall between the diffuser panel and the side wall such that distance to the back frame gradually decreases outward.

3 Claims, 6 Drawing Sheets

(52) U.S. Cl.
CPC .. *G02F 1/133606* (2013.01); *G02F 1/133603* (2013.01); *G02F 1/133608* (2013.01); *G02F 2001/133314* (2013.01)

(56) References Cited

U.S. PATENT DOCUMENTS

| | | | | |
|---|---|---|---|---|
| 2008/0117356 | A1* | 5/2008 | Oku | G02F 1/133603 349/62 |
| 2008/0316390 | A1* | 12/2008 | Lin | G02F 1/133608 349/58 |
| 2010/0026926 | A1* | 2/2010 | Nakanishi | G02F 1/133608 349/58 |
| 2012/0268688 | A1 | 10/2012 | Sato et al. | |
| 2012/0327311 | A1 | 12/2012 | Kuromizu | |
| 2015/0049280 | A1* | 2/2015 | Suzuki | G02F 1/1336 349/62 |

* cited by examiner

IMAGE DISPLAY APPARATUS

RELATED APPLICATIONS

This application is the U.S. National Phase under 35 U.S.C. § 371 of International Application No. PCT/JP2018/003999, filed on Feb. 6, 2018, which claims the benefit of Japanese Application No. 2017-161516, filed on Aug. 24, 2017, and which claims the benefit of U.S. Provisional Application 62/456,836, filed Feb. 9, 2017, the disclosures of which Applications are incorporated by reference herein.

TECHNICAL FIELD

The present disclosure relates to image display apparatuses including a display panel such as a liquid crystal cell.

BACKGROUND ART

Patent Literature (PTL) 1 discloses a display apparatus including, as a direct-lit backlight, a surface light source unit including a light-transmissive reflector for providing uniform surface illumination light having less luminance unevenness.

CITATION LIST

Patent Literature

PTL 1: Japanese Unexamined Patent Application Publication No. 2011-151002

SUMMARY OF THE INVENTION

Technical Problem

The present disclosure provides an image display apparatus that thin in appearance and is capable of displaying an image with greater luminance uniformity throughout a screen.

Solution to Problem

An image display apparatus according to the present disclosure includes: a display panel; a back frame that includes a flat portion having a substantially flat surface smaller than an active area of the display panel, and a side wall that rises from an outer edge of the flat portion and reaches an outer edge of the active area in a front view; a plurality of light sources that are arranged in rows and columns at substantially equal intervals in the flat portion; a plurality of support pins that are pillar-shaped and arranged in rows and columns at substantially equal intervals in positions in the flat portion and away from the plurality of light sources; a diffuser panel that is plate-shaped, is supported by tips of the plurality of support pins and the back frame, and diffusely emits light from the plurality of light sources toward the display panel; and a luminance-equalizing sheet that is sheet-shaped, is supported at intermediate positions on the plurality of support pins, between the diffuser panel and the back frame, has an outer edge that substantially overlaps the outer edge of the active area, and transmits part of the light from the plurality of light sources toward the diffuser panel. The luminance-equalizing sheet protrudes in a curved manner toward the side wall between the diffuser panel and the side wall such that distance between the luminance-equalizing sheet and the back frame gradually decreases from the outer edge of the flat portion to an outer edge of the side wall.

Advantageous Effect of Invention

An image display apparatus in the present disclosure is thin in appearance and is capable of displaying an image with greater luminance uniformity throughout a screen.

DESCRIPTION OF EXEMPLARY EMBODIMENTS

Figure 1:
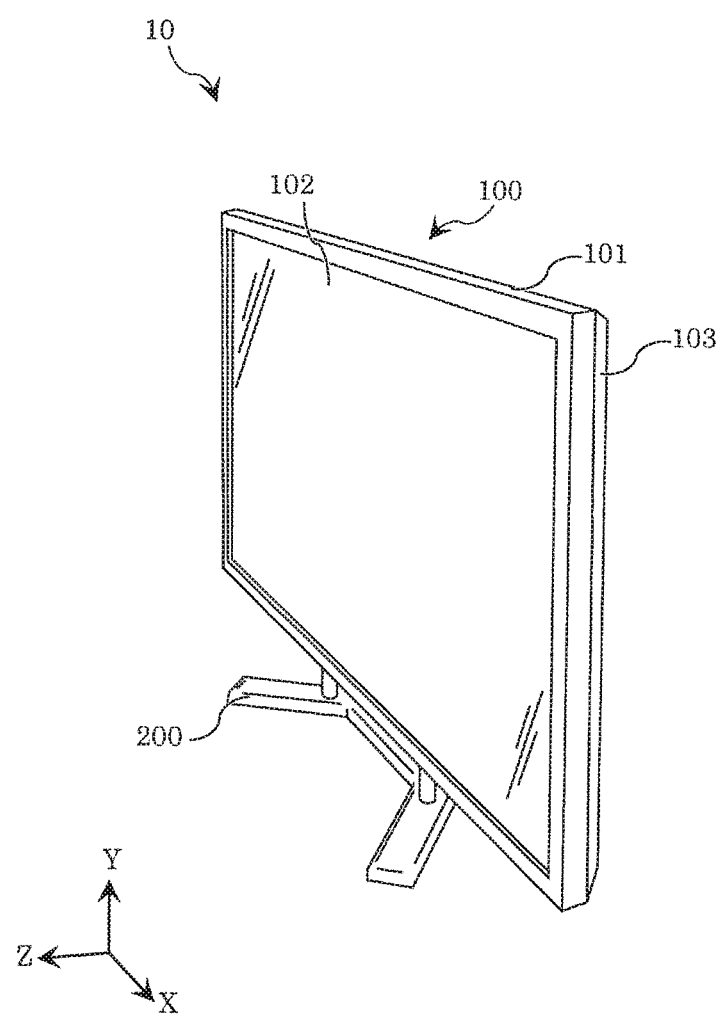
FIG. 1 is an external perspective view of a liquid crystal television according to each embodiment.

The inventors have found the following problem regarding conventional image display apparatuses.

In image display apparatuses such as conventional liquid crystal televisions, a display module circumferentially including a display panel is roughly a rectangular parallelepiped that is thin from front to back, and, to be more exact, has a shape with relatively broadly chamfered four sides on the back side of the display module. Such a shape of the display module in which the thickness is small at its end face produces a visual effect of making the display module itself look thinner than it is.

In the display module having such a shape, the peripheral portion is smaller in thickness than the other portions.

In such image display apparatuses, however, the peripheral portion cannot employ a display mechanism common to the other portions due to the limitations of internal space in a thickness direction. For this reason, it is difficult to achieve uniform image quality throughout a screen. More specifically, image display apparatuses including a direct-lit backlight system may have difficulty in achieving uniform luminance from the center to periphery of the screen.

The present disclosure has been made based on such an underlying knowledge, and the inventors have arrived, while responding to a demand for the above-described external appearance, at a concept for the structure of an image display apparatus that is capable of displaying an image with greater luminance uniformity throughout a screen.

Hereinafter, embodiments will be described with reference to the drawings appropriately. However, unnecessarily detailed descriptions may be omitted. For example, detailed description of well known matter or repeated description of essentially similar elements may be omitted. This is to avoid unnecessary redundancy and provide easily read descriptions for those skilled in the art.

It should be noted that the inventors have provided the accompanying drawings and following description in order to facilitate sufficient understanding of the present disclosure by those skilled in the art, and thus are not intended to limit the subject matter of the claims.

Prior to describing the embodiments with reference to the drawings using, as an example, an image display apparatus that is a liquid crystal television, an outline of the structure of the image display apparatus relating to both the embodiments and variation will be described below. Differences between the embodiments will be described later.

Further, although, for convenience of explanation, an up-down direction, a front-back direction, and a left-right direction of the image display apparatus correspond to the Y axis direction, the Z axis direction, and the X axis direction, respectively, in the following embodiments, these directional correspondences do not limit the orientation of the image display apparatus according to the present disclosure at the time of manufacture or use.

(Outline Configuration of Image Display Apparatus)

Figure 2:
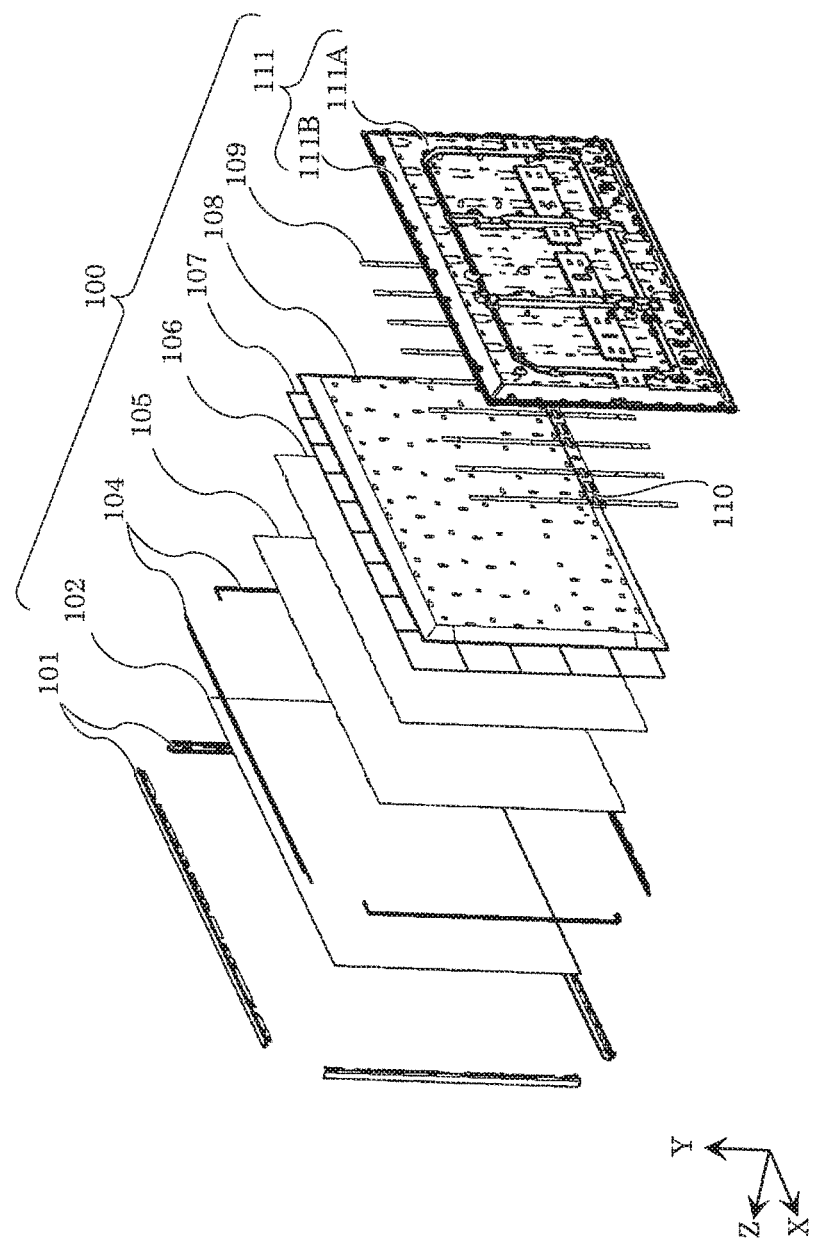
FIG. 2 is an exploded perspective view of a liquid crystal module according to each embodiment.
Figure 3:
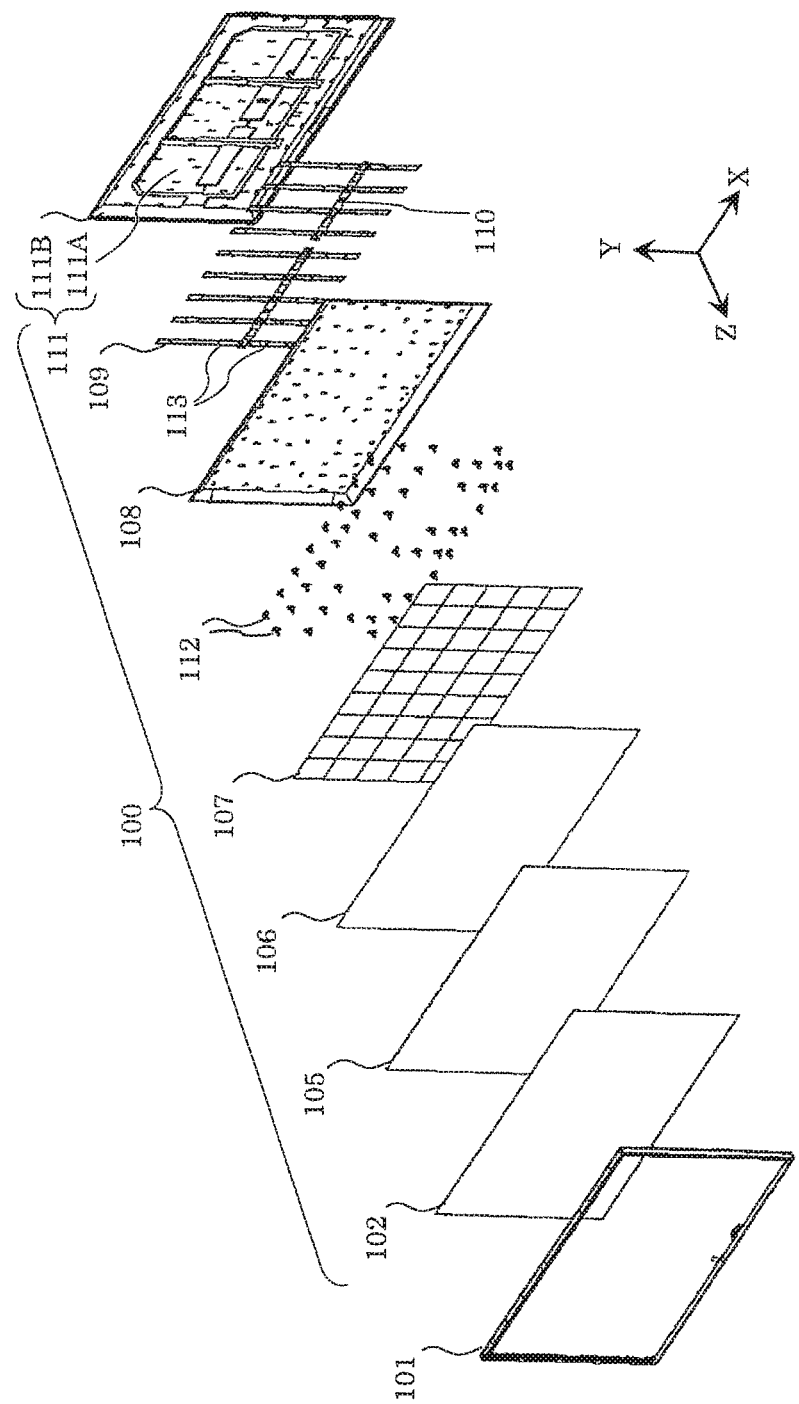
FIG. 3 is an exploded perspective view of the liquid crystal module according to each embodiment.

FIG. 1 is an external perspective view of image display apparatus 10 according to each embodiment. FIG. 2 and FIG. 3 each are an exploded perspective view of liquid crystal module 100 according to each embodiment.

Image display apparatus 10 is, for example, a liquid crystal television. As shown in FIG. 1, image display apparatus 10 includes liquid crystal module 100, bezel 101, back cover 103, and stand 200.

Liquid crystal module 100 is an image display module capable of displaying still and moving images, and includes display panel 102.

In each embodiment to be described below, display panel 102 is what is called a liquid crystal cell, and is a component in which liquid crystals are sealed between glass substrates. Display panel 102 is controlled according to an image signal inputted to image display apparatus 10 and thereby displays images.

Liquid crystal module 100 can stand on a floor or table with stand 200. In this regard, however, liquid crystal module 100 may be hung on a wall, embedded in a wall, or suspended from a ceiling with other fittings instead of stand 200, for use as image display apparatus 10.

Bezel 101 made of a resin is formed of parts corresponding to the respective four sides of image display apparatus 10, and the parts are joined to each other by, for example, screws. Bezel 101 and back cover 103 clamp together components therebetween, from display panel 102 to back frame 111, which will be described below.

As shown in FIG. 2 or FIG. 3, liquid crystal module 100 having the above configuration further includes molded frame 104, optical sheet unit 105, diffuser panel 106, luminance-equalizing sheet 107, reflective sheet 108, LED sheet 109, relay sheet 110, back frame 111, and support pins 112.

Molded frame 104 and back frame 111 clamp together components (what is called a back light unit) therebetween, from optical sheet unit 105 to LED sheet 109 and relay sheet 110. It should be noted that FIG. 3 omits molded frame 104.

Optical sheet unit 105 is configured by stacking two or three types of sheets having different optical properties. For example, optical sheet unit 105 includes a vertical prism sheet, a horizontal prism sheet, and a diffuser sheet.

Diffuser panel 106 diffusely emits, toward display panel 102, incident light from light-emitting diodes (LEDs) 113 that are disposed on LED sheet 109 and serve as light sources of image display apparatus 10.

Luminance-equalizing sheet 107 increases a degree of uniformity of luminances of light (hereinafter also referred to as emitted light) from LEDs 113 on LED sheet 109 that differ from place to place, and transmits the light toward diffuser panel 106. Luminance-equalizing sheet 107 is, for example, a sheet-shaped component that is made of a resin such as polyethylene terephthalate (PET) densely containing microscopic bubbles and that has satisfactory light reflecting properties, There are multiple holes having different diameters, that is, openings across entire luminance-equalizing sheet 107. More specifically; among the holes, holes directly above respective LEDs 113 have an exceedingly small diameter, and holes farther away from respective closest LEDs 113 have a larger diameter. Part of emitted light from LEDs 113 passes through these holes to an opposite side, that is, the side where diffuser panel 106 is present (also expressed as "light passes through luminance-equalizing sheet 107" in the present disclosure). The number, size, and distribution of the holes are adjusted so that luminance-equalizing sheet 107 equalizes amounts of transmission of light per unit area from light sources at a predetermined distance. With this configuration, luminance-equalizing sheet 107 smoothes the distribution characteristics of light emitted by each LED 113. The light from each LED 113, of which the distribution characteristics are smoothed by luminance-equalizing sheet 107, is diffused by diffuser panel 106 so that luminance unevenness is further reduced, and is emitted toward display panel 102.

Reflective sheet 108 includes holes that correspond in location and size to respective LEDs 113 on LED sheet 109, and reflects light at the entire surface on a side facing a front surface of image display apparatus 10. Reflective sheet 108 includes: a flat portion that has a substantially flat surface smaller than an active area of display panel 102; and a side wall that rises from the ends of the four sides of the flat portion and reaches the outer edge of the active area of display panel 102 in a front view of image display apparatus 10. Reflective sheet 108 as a whole is substantially shaped to conform to back frame 111 to be described later.

LED sheet 109 is a flexible printed board (hereinafter referred to as flexible printed circuits (FPCs)) on which LEDs 113 are mounted. LEDs 113 are mounted on one of two principal surfaces of the FPCs that are sheet-shaped, and a reflective layer that reflects light is disposed on the principal surface of the FPCs on which LEDs 113 are mounted, that is, the principal surface on the front side of image display apparatus 10. Further, LEDs 113 on the principal surface of LED sheet 109 are arranged in rows and columns at substantially equal intervals so that LEDs 113 can illuminate as wide an area of the back surface of display panel 102 as possible while reducing unevenness depending on a location as much as possible.

Relay sheet 110 is FPCs on which electrical paths for transmitting power, a control signal, or the like to each of LEDs 113 on LED sheet 109 are disposed. Further, like LED sheet 109, a reflective layer is disposed on a principal surface of relay sheet 110 on the front side of image display apparatus 10.

Back frame 111, also referred to as a base plate, is a plate-shaped component made of a metal plate, and supports LED sheet 109 and relay sheet 110. Back frame 111 includes: flat portion 111A having a substantially flat surface smaller than an active area of display panel 102; and side wall 111B that rises from the outer edge of flat portion 111A, that is, the ends of the four sides, and reaches the outer edge of the active area of display panel 102 when image display apparatus 10 is seen from the front side (a side on which display panel 102 is present). Since back cover 103 is shaped to conform to the external shape of back frame 111, such a shape of liquid crystal module 100 in which the four sides on the back side of the rectangular parallelpiped that is thin from front to back (along the Z axis) are relatively broadly chamfered produces the above-described visual effect of making liquid crystal module 100 look thinner than it is.

LEDs 113, which serve as the light sources, are disposed in flat portion 111A of back frame 111. More specifically, LED sheet 109 on which LEDs 113 are spaced substantially equally and relay sheet 110 are attached to flat portion 111A. Subsequently, reflective sheet 108 is further affixed to flat portion 111A so that LEDs 113 are exposed from the respective holes of reflective sheet 108. Emitted light from each LED 113 is directly incident on luminance-equalizing sheet 107 on the front side of image display apparatus 10, or is reflected by the reflective layer on the FPCs and reflective sheet 108 and then incident on luminance-equalizing sheet 107. Back frame 111 and molded frame 104 clamp together the back light unit therebetween, from optical sheet unit 105 to LED sheet 109 and relay sheet 110.

Back frame 111 may further include a configuration for supporting each component of the back light unit. For example, back frame 111 may include a cut and raised portion for hanging optical sheet unit 105, in the neighborhood of one side that is on the top side when image display apparatus 10 is placed for use. In this case, optical sheet unit 105 includes, for example, a tab having a hole for hooking on the cut and raised portion.

Support pins 112 shown in FIG. 3 are pillar-shaped components. Each of support pins 112 includes: an end to be attached to back frame 111; tip 112A that is an end opposite to the end; and flange 112B that is flanged and at a longitudinally intermediate position on the pillar shape.

Support pins 112 are attached to flat portion 111A of back frame 111 with reflective sheet 108 in between, and support pins 112 and back frame 111 clamp together reflective sheet 108.

Figure 4:
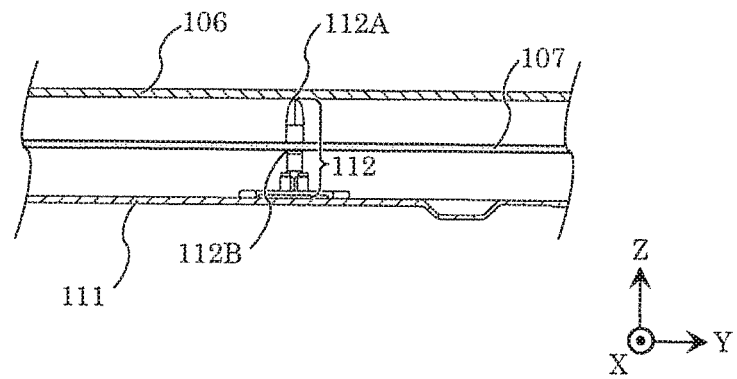
FIG. 4 is a schematic cross-sectional view of a state in which a support pin is installed in the liquid crystal module.

In addition, support pins 112 support diffuser panel 106 and luminance-equalizing sheet 107. FIG. 4 is a schematic cross-sectional view of a state in which support pin 112 attached to back frame 111 inside liquid crystal module 100 supports diffuser panel 106 and luminance-equalizing sheet 107. In this regard, however, among the components of liquid crystal module 100, those unnecessary for the illustration are omitted from FIG. 4.

Luminance-equalizing sheet 107 includes, in positions corresponding to respective support pins 112 attached to back frame 111, holes into which support pins 112 are inserted. After tip 112A of support pin 112 is inserted into the hole, luminance-equalizing sheet 107 is supported by flange 112B of support pin 112 as shown in FIG. 4.

It should be noted that support pin 112 may support luminance-equalizing sheet 107 at the longitudinally intermediate position that is designed to be at a certain appropriate distance from back frame 111 or LED 113, and this supporting configuration is not limited to flange 112B that is flanged. For example, support pin 112 may include a portion like a pedestal having a top surface instead of flange 112B, and support luminance-equalizing sheet 107 with the top surface of the portion. Alternatively, support pin 112 may include a portion that gets thicker from the front to back of liquid crystal module 100 as installed, and support luminance-equalizing sheet 107 at a location in the portion where the portion and the hole of luminance-equalizing sheet 107 fit in diameter.

Diffuser panel 106 is supported by an end of side wall 111B of back frame 111 in the periphery, and is supported by tip 112A of support pin 112 standing on flat portion 111A of back frame 111 in a portion other than the periphery as shown in FIG. 4.

Such support pins 112 are arranged in rows and columns at substantially equal intervals in flat portion 111A so that support pins 112 support the entirety of diffuser panel 106 and luminance-equalizing sheet 107. In addition, support pins 112 are arranged in positions away from respective LEDs 113, e.g. on lines each of which passes through equidistant points between horizontally or vertically adjacent two of LEDs 113, in order that support pins 112 do not block light toward luminance-equalizing sheet 107 as much as possible.

The following describes a configuration of liquid crystal module 100 for further increasing luminance uniformity throughout the screen, in such image display apparatus 10 according to the present disclosure.

Embodiment 1

Figure 5:
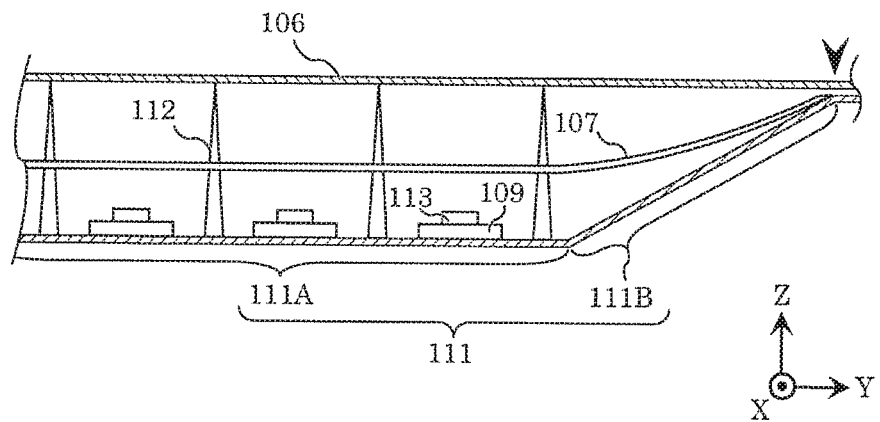
FIG. 5 is a schematic cross-sectional view of a configuration of a liquid crystal module according to Embodiment 1.

FIG. 5 is a schematic cross-sectional view of a configuration of liquid crystal module 100 according to Embodiment 1. FIG. 5 shows a cross section of part of liquid crystal module 100 which includes a portion extending from flat portion 111A to the upper part of side wall 111B of back frame 111. The configuration of liquid crystal module 100 is common to a portion extending from flat portion 111A to the lower part, right part, or left part of side wall 111B.

Figure 6:
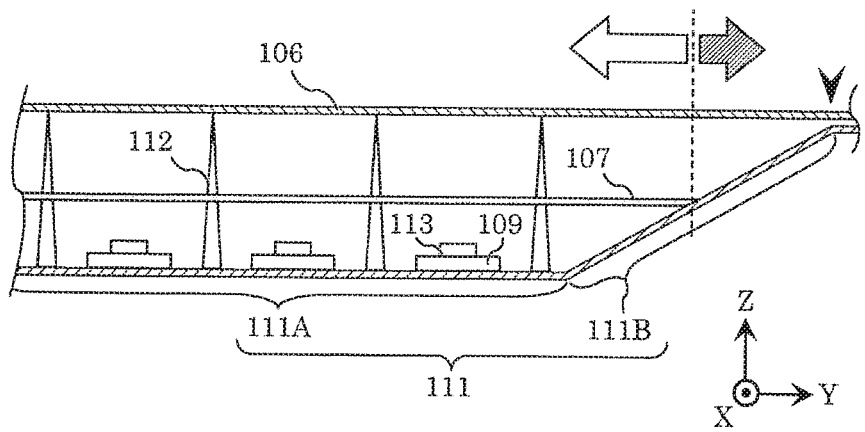
FIG. 6 is a schematic cross-sectional view of a comparative example for illustrating an advantageous effect of the liquid crystal module according to Embodiment 1.

FIG. 6 is a schematic cross-sectional view of a comparative example for illustrating an advantageous effect of the configuration of liquid crystal module 100 according to Embodiment 1. In this regard, however, among the components of liquid crystal module 100, those unnecessary for the illustration are omitted from FIG. 5 and FIG. 6. In addition, the configuration common to from FIG. 1 to FIG. 4 is indicated by more simplified diagrams in consideration of visibility.

The wedge shape in FIG. 5 and FIG. 6 indicates a position of the upper outer edge (upper end) of the active area of display panel 102 in a lateral view. As described above, side wall 111B extends from the outer edge of flat portion 111A to the outer edge of the active area of display panel 102.

As shown in FIG. 5, luminance-equalizing sheet 107 also has the outer edge that reaches the outer edge of the active area of display panel 102. Moreover, although the cross section of FIG. 5 does not entirely show luminance-equalizing sheet 107, the outer edge of luminance-equalizing sheet 107 substantially overlaps the outer edge of the active area, and luminance-equalizing sheet 107 covers back frame 111 from end to end. Furthermore, although distance between luminance-equalizing sheet 107 and back frame 111 is constant relative to flat portion 111A, this distance is gradually decreased from the outer edge of flat portion 111A to the outer edge of side wall 111B by luminance-equalizing sheet 107 protruding in a curved manner toward side wall 111B between diffuser panel 106 and side wall 111B. With this configuration, in the entirety of the active area, emitted light from each LED 113 directly passes through luminance-equalizing sheet 107 and incident on diffuser panel 106, or is reflected by reflective sheet 108 above back frame 111 or the reflective layer of LED sheet 109, passing through luminance-equalizing sheet 107, and incident on diffuser panel 106.

Here, the configuration shown in FIG. 5 is compared with the configuration shown in FIG. 6 so as to describe the advantageous effect of the former. In the configuration shown in FIG. 6, luminance-equalizing sheet 107 is entirely flat. Accordingly, distance between luminance-equalizing sheet 107 and back frame 111 is constant relative to flat portion 111A, and gradually decreases from the outer edge of flat portion 111A toward the outside, relative to side wall 111B. In this regard, however, luminance-equalizing sheet 107 touches side wall 111B but does not reach the outer edge of the active area of display panel 102. The dashed line in FIG. 6 indicates a vertical (Y-axial) position in which luminance-equalizing sheet 107 touches side wall 111B, and a position on diffuser panel 106 corresponding to the vertical position.

Out of light incident on diffuser panel 106, light incident on an area inner (on a side indicated by the white arrow) of the dashed line has the distribution characteristic that has been smoothed by luminance-equalizing sheet 107. In contrast, there is no light that reaches an area outer (on a side indicated by the hatched arrow) of the dashed line before passing through luminance-equalizing sheet 107, light incident on diffuser panel 106 is only light that travels a certain distance in the inner area after passing through luminance-equalizing sheet 107, and such incident light is weaker than the light incident on the inner area. This state occurs in four peripheral areas in the active area of display panel 102, and the peripheral areas of the screen show luminance differences due to the presence or absence of luminance-equalizing sheet 107 immediately under the peripheral areas. Such luminance differences may appear on the screen as unevenness visible to a user.

By comparison, in the configuration in Embodiment 1 shown in FIG. 5, luminance-equalizing sheet 107 is larger in outside dimension than the comparative example, and the outer edge of luminance-equalizing sheet 107 reaches the outer edge of the active area of display panel 102. There is a space between luminance-equalizing sheet 107 and side wall 111B of back frame 111 from the position where side wall 111B rises to the extreme vicinity of the outer edge of the active area. Light from LED 113 travels while being reflected between luminance-equalizing sheet 107 and reflective sheet 108 along back frame 111, and reaches the extreme vicinity of the outer edge of the active area. Light incident on diffuser panel 106 is adjusted by luminance-equalizing sheet 107 so that the entire active area of display panel 102 has as uniform light intensity as possible. Accordingly, the light incident on diffuser panel 106 is more intense in the four peripheral areas in the active area than the light incident on diffuser panel 106 in the configuration shown in FIG. 6, and has great uniformity in the entire active area. Therefore, liquid crystal module 100 according to Embodiment 1 is capable of displaying an image with greater luminance uniformity from the center to peripheral areas of the screen.

Image display apparatus 10 according to Embodiment 1 includes: display panel 102; back frame 111; LEDs 113 that are light sources; support pins 112 that are pillar-shaped; diffuser panel 106 that is plate-shaped, and luminance-equalizing sheet 107 that is sheet-shaped. Back frame 111 includes flat portion 111A having a substantially flat surface smaller than an active area of display panel 102, and side wall 111B that rises from an outer edge of flat portion 111A and reaches an outer edge of the active area in a front view. LEDs 113 are arranged in rows and columns at substantially equal intervals in flat portion 111A. Support pins are arranged in rows and columns at substantially equal intervals in positions in flat portion 111A and away from LEDs 113. Diffuser panel 106 is supported by tips of support pins 112 and back frame 111, and diffusely emits light from LEDs 113 toward display panel 102. Luminance-equalizing sheet 107 is supported at intermediate positions on support pins 112, between diffuser panel 106 and back frame 111, has an outer edge that substantially overlaps the outer edge of the active area, and transmits part of the light from LEDs 113 toward diffuser panel 106. Moreover, luminance-equalizing sheet 107 protrudes in a curved manner toward side wall 111B between diffuser panel 106 and side wall 111B such that distance between luminance equalizing sheet 107 and back frame 111 gradually decreases from the outer edge of flat portion 111A to an outer edge of side wall 111B.

In such image display apparatus 10, light from LEDs 113 can reach the extreme vicinity of the outer edge of the active area of display panel 102 between luminance-equalizing sheet 107 and back frame 111. Subsequently, the light having passed through luminance-equalizing sheet 107 enters diffuser panel 106 also from the extreme vicinity of the outer edge of the active area, is diffused by diffuser panel 106, and is emitted toward display panel 102. Accordingly, image display apparatus 10 is capable of displaying an image with greater luminance uniformity from the center to peripheral areas of the screen.

Embodiment 2

Figure 7:
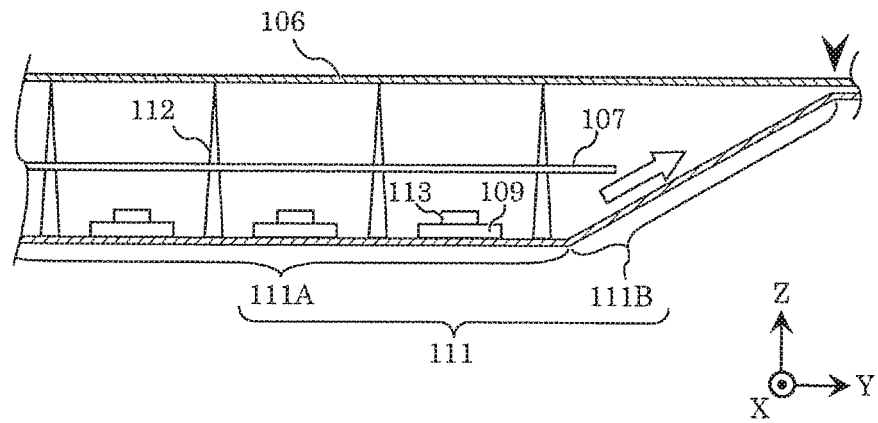
FIG. 7 is a schematic cross-sectional view of a configuration of a liquid crystal module according to Embodiment 2.

FIG. 7 is a schematic cross-sectional view of a configuration of liquid crystal module 100 according to Embodiment 2. Like FIG. 5, FIG. 7 shows a cross section of liquid crystal module 100 which includes a portion extending from flat portion 111A to the upper part of side wall 111B of back frame 111. In this regard, however, among the components of liquid crystal module 100, those unnecessary for the illustration are omitted from FIG. 7, In addition, the configuration common to from FIG. 1 to FIG. 4 is indicated by a more simplified diagram in consideration of visibility. Like in FIG. 5, the wedge shape in FIG. 7 indicates a position of the upper outer edge (upper end) of the active area of display panel 102 in the lateral view. The configuration of liquid crystal module 100 is common to a portion extending from flat portion 111A to the lower part, right part, or left part of side wall 111B.

The following mainly describes differences from Embodiment 1 or the comparative example shown in FIG. 6.

As shown in FIG. 7, liquid crystal module 100 according to Embodiment 2 has a gap between luminance-equalizing sheet 107 and side wall 111B of back frame 111.

As stated above, in the comparative example, out of the light from LEDs 113, the light that reaches the peripheral areas of the screen of image display apparatus 10 is only the light passing through luminance-equalizing sheet 107. Further, in Embodiment 1, the configuration that allows the light from LEDs 113 to travel while being reflected between luminance-equalizing sheet 107 and reflective sheet 108 also allows the light to reach the peripheral areas.

In contrast, in order to allow light from LEDs 113 to reach the peripheral areas, liquid crystal module 100 according to Embodiment 2 includes luminance-equalizing sheet 107 smaller in outside dimension than luminance-equalizing sheet 107 of the comparative example shown in FIG. 6, and has a gap for allowing passage of light between luminance-equalizing sheet 107 and side wall 111B of back frame 111. The white arrow in FIG. 7 indicates a path along which the light from LEDs 113 enters the peripheral areas.

Accordingly, the light from LEDs 113 goes around luminance-equalizing sheet 107 to the peripheral areas of liquid crystal module 100. This light compensates luminance in the peripheral areas far from LEDs 113, and as a result, liquid crystal module 100 is capable of displaying an image with greater luminance uniformity from the center to peripheral areas of the screen.

Embodiment 3

Figure 8:
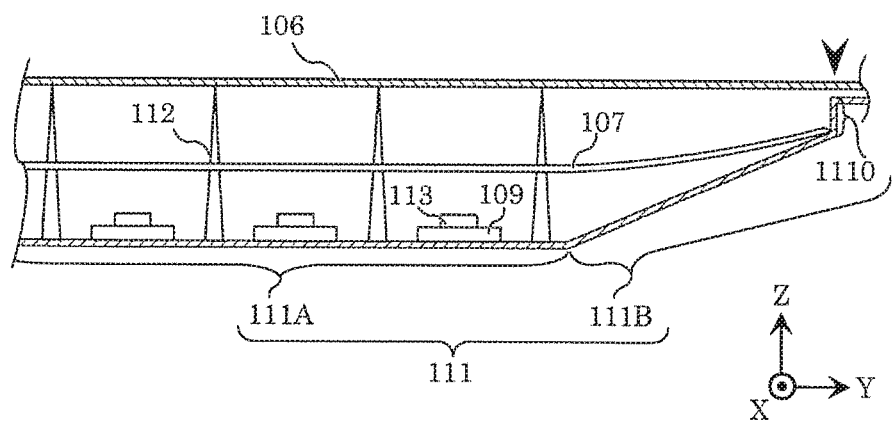
FIG. 8 is a schematic cross-sectional view of a configuration of a liquid crystal module according to Embodiment 3.

FIG. 8 is a schematic cross-sectional view of a configuration of liquid crystal module 100 according to Embodiment 3. Like FIG. 5 and FIG. 7, FIG. 8 shows a cross section of liquid crystal module 100 which includes a portion extending from flat portion 111A to the upper part of side wall 113B of back frame 111. In this regard, however, among the components of liquid crystal module 100, those unnecessary for the illustration are omitted from FIG. 8. In addition, the configuration common to from FIG. 1 to FIG. 4 is indicated by a more simplified diagram in consideration of visibility. Like in FIG. 5 and FIG. 7, the wedge shape in FIG. 8 indicates a position of the upper outer edge (upper end) of the active area of display panel 102 in the lateral view. The configuration of liquid crystal module 100 is common to a portion extending from flat portion 111A to the lower part, right part, or left part of side wall 111B.

The following mainly describes differences from Embodiment 1.

As shown in FIG. 8, in liquid crystal module 100 according to Embodiment 3, side wall 111B of back frame 111 includes standing wall 1110 extending from the outer edge of side wall 111B as the starting point toward diffuser panel 106. Further, the outer edge of luminance-equalizing sheet 107 reaches the outer edge of side wall 111B and substantially overlaps the starting point of standing wall 1110. Accordingly, compared to liquid crystal module 100 shown in FIG. 5, a distance that is substantially equal to the height (the length in the Z axis direction) of standing wall 1110 is maintained between diffuser panel 106 and luminance-equalizing sheet 107.

In the configuration of Embodiment 1, the outer edge of luminance-equalizing sheet 107 is extremely close to diffuser panel 106 in the vicinity of the outer edge of the active area of display panel 102. In this case, luminance-equalizing sheet 107 casts a shadow on diffuser panel 106 in the vicinity of the outer edge of the active area, and a luminance difference between a portion on which this shadow is cast and the other portion can appear on the screen as luminance unevenness visible to the user. By maintaining a predetermined distance between diffuser panel 106 and luminance-equalizing sheet 107 with the above-described configuration, however, it is possible to inhibit luminance-equalizing sheet 107 from casting a shadow on diffuser panel 106 or at least thin such a shadow.

Standing wall 1110 may be substantially directly below the active area of display panel 102. Further, more preferably, standing wall 1110 may be spaced outward from the active area by approximately 1 mm to 2 mm. Accordingly, entire display panel 102 can be more surely included in an illumination range of light going through luminance-equalizing sheet 107.

Also in liquid crystal module 100 according to Embodiment 3, light from LED 113 travels while being reflected between luminance-equalizing sheet 107 and reflective sheet 108, and reaches the extreme vicinity of the outer edge of the active area. In the meantime, the predetermined distance is maintained between diffuser panel 106 and luminance-equalizing sheet 107, and thus it is possible to reduce the occurrence of luminance unevenness visible to the user, by inhibiting luminance-equalizing sheet 107 from casting a shadow on diffuser panel 106 or thinning a shadow. Accordingly, liquid crystal module 100 according to Embodiment 3 is capable of displaying an image with greater luminance uniformity from the center to peripheral areas of the screen.

It should be noted that to give an example of the size of standing wall 1110, when a distance between back frame 111 and diffuser panel 106 is 20 mm, and a distance between back frame 111 and luminance-equalizing sheet 107 is 10 mm, standing wall 1110 having a height of approximately 3 mm may be provided. However, these sizes are changed in design for adjustment according to the size or desired exterior appearance of entire liquid crystal module 100, the density or emission intensity of arranged LEDs 113, or the like, and are not intended to limit the configuration of liquid crystal module 100 according to Embodiment 3.

Moreover, although the effect of inhibiting luminance-equalizing sheet 107 from casting a shadow on diffuser panel 106 is further enhanced with an increase in the height of standing wall 1110, it becomes difficult to make image display apparatus 10 look thin. It is desirable that the height of standing wall 1110 be determined in consideration of this point.

In image display apparatus 10 according to Embodiment 3, side wall 111B includes standing wall 1110 extending from the outer edge as the starting point toward diffuser panel 106, and the outer edge of luminance-equalizing sheet 107 substantially overlaps the starting point of standing wall 1110.

In such image display apparatus 10, a gap according to the height of standing wall 1110 is provided between diffuser panel 106 and the outer edge of luminance-equalizing sheet 107 closest to diffuser panel 106. Accordingly, luminance-equalizing sheet 107 is inhibited from casting a shadow on diffuser panel 106 or a cast shadow is thinned. Image display apparatus 10 is capable of displaying an image with greater luminance uniformity from the center to peripheral areas of the screen.

Variation of Embodiment 3

Figure 9:
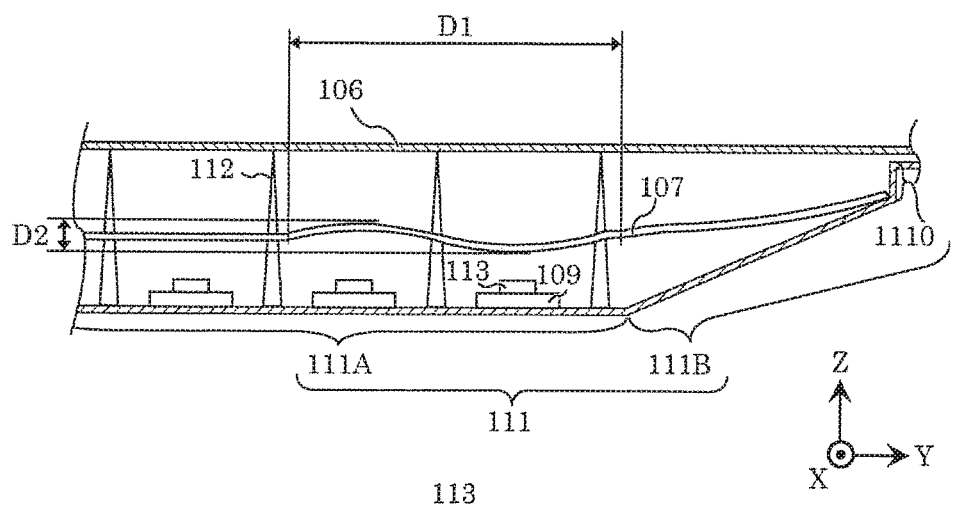
FIG. 9 is a schematic cross-sectional view of a distortion of a luminance-equalizing sheet that can be caused around a support pin in the liquid crystal module according to Embodiment 3.

The curved shape of luminance-equalizing sheet 107 in Embodiment 1 or 3 may be the shape of molded luminance-equalizing sheet 107 itself. However, by taking advantage of the flexibility of luminance-equalizing sheet 107 made of a resin and sheet-shaped as described above, luminance-equalizing sheet 107, which originally has a flat shape and is larger in outside dimension than the active area of display panel 102, may be caused to form such a shape by bringing the outer edge of luminance-equalizing sheet 107 into contact with back frame 111 and warping luminance-equalizing sheet 107. In this case, luminance-equalizing sheet 107 pushes against back frame 111 due to the elasticity of luminance-equalizing sheet 107 itself, and is supported by back frame 111. At this time, a distortion of luminance-equalizing sheet 107 in the vertical direction (the Z axis direction) can occur around a portion fixed by support pins 112 due to the influence of stress generated in luminance-equalizing sheet 107. FIG. 9 is a schematic cross-sectional view of such a distortion caused in liquid crystal module 100 according to Embodiment 3. Like FIG. 5 etc., FIG. 9 shows a cross section of liquid crystal module 100 which includes a portion extending from flat portion 111A to the upper part of side wall 111B of back frame 111.

In FIG. 9, an undulating distortion of luminance-equalizing sheet 107 is seen in a range indicated by double-headed arrow D1 pointing to the right and the left. Double-headed arrow D2 pointing upward and downward indicates the magnitude of the undulating distortion.

In the range in which the distortion as shown in FIG. 9 is caused in luminance-equalizing sheet 107, distances between respective LEDs 113 and luminance-equalizing sheet 107 vary unexpectedly, and the holes having the diameters determined according to the distances from LEDs 113 have difficulty adjusting the distribution characteristics of light as intended. In other words, the luminance unevenness visible to the user appears on the screen of image display apparatus 10. The following describes a configuration for solving a such a problem with reference to FIG. 10 and FIG. 11.

Figure 10:
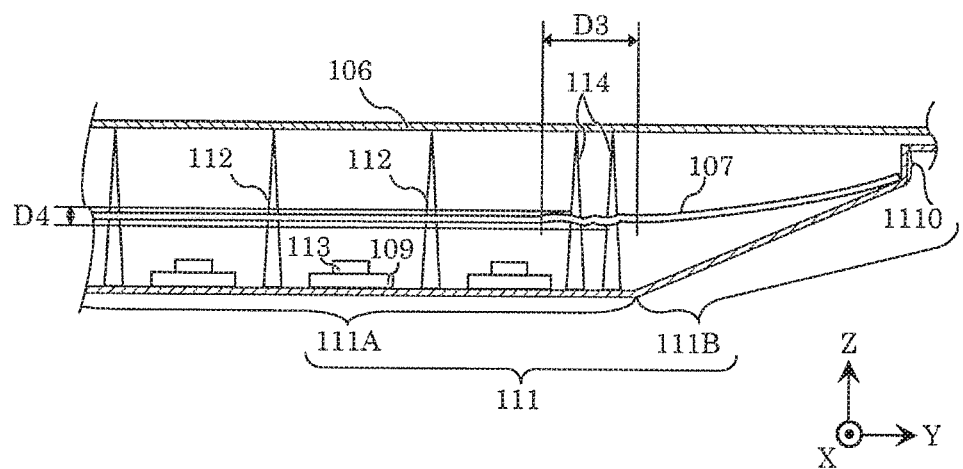
FIG. 10 is a schematic cross-sectional view of a configuration of a liquid crystal module according to a variation of Embodiment 3.
Figure 11:
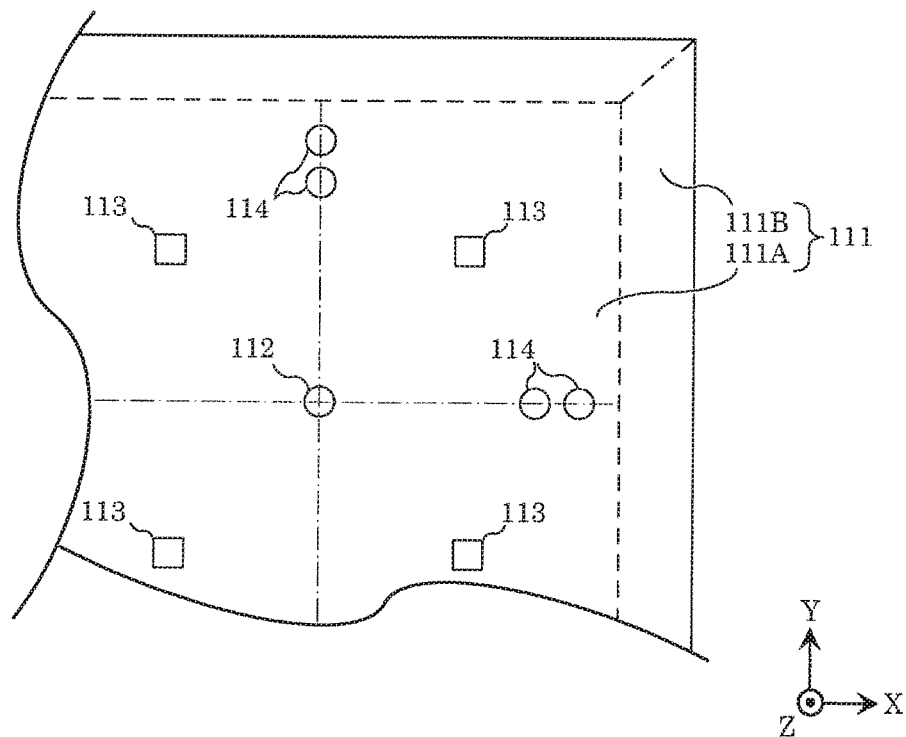
FIG. 11 is a front view of the configuration of the liquid crystal module according to the variation of Embodiment 3.

FIG. 10 is a schematic cross-sectional view of a configuration of liquid crystal module 100 according to the present variation. FIG. 11 is a front view of the configuration of liquid crystal module 100 according to the present variation. Like FIG. 9 etc., FIG. 10 shows a cross section of liquid crystal module 100 which includes a portion extending from flat portion 111A to the upper part of side wall 111B of back frame 111. FIG. 11 shows an upper right corner portion of back frame 111 seen from front (a side on which display panel 102 is present). In this regard, however, among the components of liquid crystal module 100, those unnecessary for the illustration of the present variation are omitted from FIG. 10 and FIG. 11. In addition, the configuration common to from FIG. 1 to FIG. 4 is indicated by a more simplified diagram in consideration of visibility. In FIG. 11, the dashed lines indicate valley fold portions, and the alternate long and short, dash lines indicate virtual lines passing through equidistant points between horizontally or vertically adjacent two of LEDs 113.

Liquid crystal module 100 according to the present variation further includes auxiliary support pins 114 that are pillar-shaped and on the virtual lines (the alternate long and short dash lines in FIG. 11) on which support pins 112 are disposed. Auxiliary support pins 114 also support luminance-equalizing sheet 107 between diffuser panel 106 and back frame 111. Positions in the Z axis direction at which auxiliary support pins 114 support luminance-equalizing sheet 107, that is, the height from back frame 111 is the same as the height at which support pins 112 support luminance-equalizing sheet 107.

Assuming that two auxiliary support pins 114 adjacent to each other on the same line make a set, the set of auxiliary support pins 114 is closer to the outer edge of flat portion 111A than support pins 112 and LEDs 113. Further, intervals between the set of auxiliary support pins 114 are narrower than intervals between support pins 112.

The undulating distortion of luminance-equalizing sheet 107 caused by the above stress is further reduced due to the narrower intervals between auxiliary support pins 114 (double-headed arrow D4 in FIG. 10).

The reason why auxiliary support pin 114 is disposed closer to the outer edge of flat portion 111A than LEDs 113 in flat portion 111A is that it is intended to maintain, in a further inner region of luminance-equalizing sheet 107 directly below which LEDs 113 in the rows and columns are present, a wider area which has no distortion and is continuously flat. In the present variation, as shown in FIG. 10, the distortion of luminance-equalizing sheet 107 is minimized in a narrower area (double-headed arrow D3 in FIG. 10) outside of the region.

It should be noted that the reason why auxiliary support pins 114 are disposed on the above lines is that it is intended to minimize the impact of a shadow extending toward side wall 111B created by auxiliary support pins 114 blocking light from LEDs 113, by keeping auxiliary support pins 114 at a distance from all LEDs 113 as much as possible.

Accordingly; liquid crystal module 100 according to the variation of Embodiment 3 is capable of displaying an image with greater luminance uniformity from the center to peripheral areas of the screen.

It should be noted that although two auxiliary support pins 114 make a set above, three or more auxiliary support pins 114 may make a set according to the need for minimizing a distortion. However, as stated above, since a shadow created by auxiliary support pins 114 blocking light from LEDs 113 impacts on luminance uniformity, it is desirable that the number of auxiliary support pins 114 making a set be as few as possible.

Moreover, among support pins 112 arranged in rows and columns at substantially equal intervals in flat portion 111A, support pin 112 on one end of each row or each column and at least one support pin at shorter intervals from support pin 112 may be interpreted as a set of auxiliary support pins 114.

Moreover, when three or more auxiliary support pins 114 make a set, intervals between the auxiliary support pins need not be equal.

Moreover, auxiliary support pins 114 support luminance-equalizing sheet 107 at a predetermined height from back frame 111 to minimize the distortion of luminance-equalizing sheet 107, and the predetermined height is the same as the height at which support pins 112 support luminance-equalizing sheet 107. However, unlike support pins 112, all auxiliary support pins 114 need not support diffuser panel 106. For example, of a set of auxiliary support pins 114, auxiliary support pins 114 other than one auxiliary support pin 114 may have a height and a structure for supporting luminance-equalizing sheet 107, e.g. may include two flanges that clamp luminance-equalizing sheet 107 at a predetermined height and be shorter than support pins 112. This configuration can reduce an amount of light going through luminance-equalizing sheet 107 blocked by auxiliary support pins 114 as much as the configuration with no auxiliary support pin 114 as shown in FIG. 8. Further, in connection with the configuration, auxiliary support pins 114 need not have the same shape as support pins 112, and may be thinner than support pins 112, for example. Consequently, it is possible to further reduce the impact of the shadow cast on side wall 111B.

Moreover, the above configuration described as the variation of Embodiment 3 is also applicable as a variation of Embodiment 1. In the configuration of liquid crystal module 100 according to Embodiment 1 not including standing wall 1110, since the curvature (a difference in height in the Z axis direction) of luminance-equalizing sheet 107 in the peripheral areas is greater, a distortion amount in the further inner region can be great. Accordingly, by auxiliary support pins 114 being provided to minimize the distortion, liquid crystal module 100 is capable of displaying an image with greater luminance uniformity from the center to peripheral areas of the screen.

In image display apparatus 10 according to the above-described present variation, support pins 112 are on the lines passing through the equidistant points between horizontally or vertically adjacent two of LEDs 113 serving as the light sources. In addition, image display apparatus 10 further includes a set of at least two auxiliary support pins 114 that are pillar-shaped and support luminance-equalizing sheet 107 between back frame 111 and diffuser panel 106 in positions which are on the lines and at which auxiliary support pins 114 are closer to the outer edge of flat portion 111A than support pins 112 and LEDs 113. The intervals between the set of at least two auxiliary support pins 114 is narrower than the intervals between support pins 112.

In such image display apparatus 10, auxiliary support pins 114 reduce the curvature of the distortion of luminance-equalizing sheet 107 that can be caused by the stress. Since this reduces the variation in distance between LEDs 113 and luminance-equalizing sheet 107, the effect of adjusting the distribution characteristics of light with luminance-equalizing sheet 107 can be produced almost as intended by design. Further, auxiliary support pins 114 are closer to the outer edge of luminance-equalizing sheet 107, and thus a more widely continuous flat area is provided in luminance-equalizing sheet 107. Accordingly, image display apparatus 10 is capable of displaying an image with greater luminance uniformity from the center to peripheral areas of the screen.

Other Embodiments

As described above, Embodiments 1 to 3 have been given as examples of the techniques disclosed in the present application. However, the techniques disclosed in the present application are not limited to these examples, and are also applicable to embodiments as a result of appropriate modification, replacement, addition, and omission, for instance.

For example, although LEDs 113 have been described as the light sources above, each of Embodiments 1 to 3 and the variation are also applicable to image display apparatuses using a direct-lit backlight system which includes light sources other than LEDs. Examples of the light sources other than the LEDs included in the image display apparatuses to which each of Embodiments 1 to 3 and the variation are applied include a cold-cathode tube and a fluorescent tube.

Moreover, although reflective sheet 108 clamped by support pins 112 and back frame 111 has been given as an example of the configuration for reflecting light from the light sources and guiding the reflected light to the outer edge of the active area, the configuration of image display apparatus 10 is not limited to this. For example, the entire front surface of back frame 111 may be coated with a material having high optical reflectance or back frame 111 itself may be made of a material having high optical reflectance. In this regard, reflective sheet 108 as a reflective material and back frame 111 may be considered as identical, and, for example, the distance between luminance-equalizing sheet 107 and back frame 111 in the above description can be interpreted as being the same as the distance between luminance-equalizing sheet 107 and reflective sheet 108.

Moreover, although image display apparatus 10 has been described as, for example, a liquid crystal television, other examples of image display apparatus 10 include a monitor for personal computers and a display for digital signage.

Moreover, the components described in each of Embodiments 1 to 3 and the variation can be combined to create a new embodiment.

Moreover, Embodiments 1 to 3 and the variation described above are intended to illustrate the techniques in the present application, and thus various modifications, replacements, addition, omissions, etc. may be made within the scope of claims and the equivalents thereof.

INDUSTRIAL APPLICABILITY

The present disclosure is applicable to image display apparatuses that look thin in appearance by reducing the thickness of a peripheral portion more than the thickness of other portions. More specifically, the present disclosure is applicable to television receivers, monitors, displays for digital signage, etc.

The invention claimed is:

1. An image display apparatus, comprising:
a display panel;
a back frame that includes a flat portion having a substantially flat surface smaller than an active area of the display panel, and a side wall that rises from an outer edge of the flat portion and reaches an outer edge of the active area in a front view;
a plurality of light sources that are arranged in rows and columns at substantially equal intervals in the flat portion;
a plurality of support pins that are pillar-shaped and arranged in rows and columns at substantially equal intervals in positions in the flat portion and away from the plurality of light sources;
a diffuser panel that is plate-shaped, is supported by tips of the plurality of support pins and the back frame, and diffusely emits light from the plurality of light sources toward the display panel; and
a luminance-equalizing sheet that has a plurality of through holes, is supported at intermediate positions on the plurality of support pins, between the diffuser panel and the back frame, has an outer edge that substantially overlaps the outer edge of the active area, covers the plurality of light sources and transmits part of the light from the plurality of light sources toward the diffuser panel through the plurality of through holes,
wherein the plurality of through holes go through the luminance-equalizing sheet in a direction parallel to a direction from the plurality of light sources to the diffuser panel, and are so arranged to equalize amounts of transmission of light per unit area from the plurality of light sources, and
wherein the luminance-equalizing sheet protrudes in a curved manner toward the side wall between the diffuser panel and the side wall such that distance between the luminance-equalizing sheet and the back frame gradually decreases from the outer edge of the flat portion to an outer edge of the side wall.

2. The image display apparatus according to claim 1, wherein the side wall includes a standing wall that extends from the outer edge of the side wall as a starting point toward the diffuser panel, and
the outer edge of the luminance-equalizing sheet substantially overlaps the starting point.

3. The image display apparatus according to claim 1, wherein the plurality of support pins are on lines each of which passes through equidistant points between horizontally or vertically adjacent two of the plurality of light sources,
the image display apparatus further comprising: a set of at least two auxiliary support pins that are pillar-shaped and support the luminance-equalizing sheet between the back frame and the diffuser panel in positions that are on the lines and at which the set of at least two auxiliary support pins are closer to the outer edge of the flat portion than the plurality of support pins and the plurality of light sources,
wherein intervals between the set of at least two auxiliary support pins are narrower than intervals between the plurality of support pins.

* * * * *